US007159453B2

(12) United States Patent
Muto et al.

(10) Patent No.: US 7,159,453 B2
(45) Date of Patent: Jan. 9, 2007

(54) CONTROL DEVICE OF INTERNAL COMBUSTION ENGINE

(75) Inventors: Harufumi Muto, Aichi-ken (JP); Satoshi Furukawa, Kariya (JP); Naoki Maeda, Anjo (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/230,456

(22) Filed: Sep. 21, 2005

(65) Prior Publication Data

US 2006/0069492 A1 Mar. 30, 2006

(30) Foreign Application Priority Data

Sep. 24, 2004 (JP) ............................ 2004-276667

(51) Int. Cl.
*G01M 19/00* (2006.01)

(52) U.S. Cl. .................................................... 73/118.2

(58) Field of Classification Search .................. 73/116, 73/117.2, 117.3, 118.1, 118.2, 202, 202.5; 701/29, 99, 101
See application file for complete search history.

(56) References Cited

U.S. PATENT DOCUMENTS

| | | | | |
|---|---|---|---|---|
| 5,186,044 | A * | 2/1993 | Igarashi et al. | 73/118.2 |
| 5,515,828 | A * | 5/1996 | Cook et al. | 123/436 |
| 6,644,104 | B1 | 11/2003 | Muto et al. | |
| 7,099,767 | B1 * | 8/2006 | Muto et al. | 701/102 |
| 2006/0089780 | A1 * | 4/2006 | Muto et al. | 701/103 |

FOREIGN PATENT DOCUMENTS

| | | |
|---|---|---|
| JP | A 2000-320391 | 11/2000 |
| JP | A 2002-97994 | 4/2002 |

* cited by examiner

*Primary Examiner*—Eric S. McCall
(74) *Attorney, Agent, or Firm*—Oliff & Berridge, PLC

(57) ABSTRACT

A control device able to find the intake air flow rate in an internal combustion engine having a plurality of intake passages upstream of a throttle valve is provided. The control device finds the intake air flow rate of the internal combustion engine by converting an output voltage of each of air flow sensors provided in the intake passages to a flow rate based on a relationship between an output voltage and flow rate found in advance for each air flow sensor, correcting the obtained flow rate in accordance with temperature characteristics of each the air flow sensor, and adding the corrected flow rates to calculate a total flow rate.

8 Claims, 3 Drawing Sheets

CONTROL DEVICE OF INTERNAL COMBUSTION ENGINE

BACKGROUND OF THE INVENTION

1. Field of the Invention

The present invention relates to a control device of an internal combustion engine.

2. Description of the Related Art

In an internal combustion engine, to obtain the optimal output and to effectively purify exhaust gas, the amount of air filled into a cylinder (cylinder filling air) must be found. For this purpose, normally, the amount of air taken into the internal combustion engine per unit time (intake air flow rate) is found. As the method of finding this intake air flow rate, the method is known of providing an air flow sensor in the intake passage and using that air flow sensor to directly find the intake air flow rate (for example, see Japanese Unexamined Patent Publication (Kokai) No. 2002-97994).

However, depending on the internal combustion engine, sometimes there are a plurality of intake passages upstream of the throttle-valve. Japanese Unexamined Patent Publication (Kokai) No. 2002-97994 only covers the case where there is a single intake passage upstream of the throttle valve. It does not describe the method of finding the intake air flow rate for the case of a plurality of intake passages.

SUMMARY OF THE INVENTION

An object of the present invention is to provide a control device able to find the intake air flow rate in an internal combustion engine having a plurality of intake passages upstream of a throttle valve.

According to the present invention, there is provided a control device for finding an intake air flow rate in an internal combustion engine having a plurality of intake passages upstream of a single throttle valve and having air flow sensors provided in the intake passages, the control device finding the intake air flow rate of the internal combustion engine by converting an output voltage of each air flow sensor to a flow rate based on a relationship between an output voltage and flow rate found in advance for each air flow sensor, correcting the obtained flow rate in accordance with a temperature characteristic of each air flow sensor, and adding the corrected flow rates to calculate a total flow rate. According to this, it is possible to find the intake air flow rate by using air flow sensors even in an internal combustion engine having a plurality of intake passages upstream of a single throttle valve.

Preferably, the device has a correction coefficient for correcting at least one of the effects of intake pulsation and intake drift and multiplies the correction coefficient with the total flow rate to calculate a corrected total flow rate. According to this, it is possible to find the intake air flow rate more accurately considering also the intake pulsation and intake drift.

Preferably, the device has an upper limit setting means for setting an upper limit of the intake air flow rate and makes the upper limit the intake air flow rate when the value of the intake air flow rate found exceeds the upper limit set by the upper limit setting means. According to this, even if for example back flow occurs, the value of the intake air flow rate found will not greatly deviate from the actual intake air flow rate.

Preferably, the device has an abnormality detecting means for detecting abnormalities in the air flow sensors, and, when an air flow sensor is detected as being abnormal, the intake air flow rate is found by deeming the air flow rate of the intake passage provided with the air flow sensor detected as being abnormal to be the average value of the air flow rates of the intake passages provided with the normally operating air flow sensors. According to this, even if one or more air flow sensors suffers from an abnormality, it is possible to find the substantially accurate intake air flow rate.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
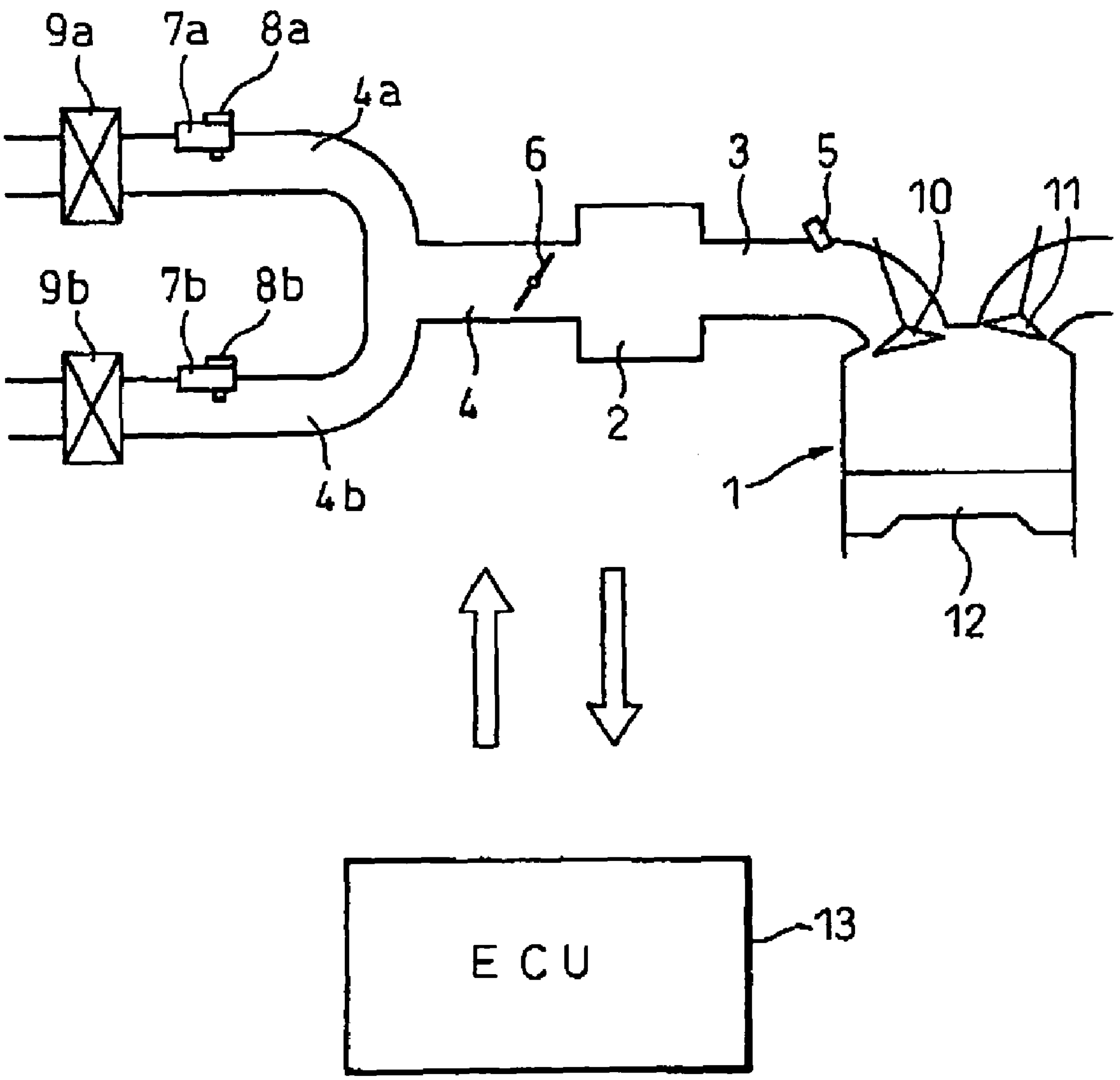
FIG. 1 is a schematic view of an internal combustion engine in which a control device of an embodiment of the present invention is mounted.

Below, a preferred embodiment of the present invention will be explained with reference to the drawings. FIG. 1 is a schematic view of an internal combustion engine in which a control device of an embodiment of the present invention is mounted. In the figure, Reference numeral 1 indicates an engine body and 2 indicates a surge tank common to the cylinders. Reference numeral 3 indicates an intake tube connecting the surge tank 2 and a cylinder, and 4 indicates an intake passage upstream of the surge tank 2. This intake passage 4 is split into a first intake passage part **4*a* and a second intake passage part 4*b*** at the upstream side.

Each intake tube 3 is provided with a fuel injector 5. A throttle valve 6 is arranged directly upstream of the surge tank 2 in the intake passage 4. The throttle valve 6 may also be one associated with an accelerator pedal, but here it is made one able to be freely set in opening degree by a step motor or other drive device.

The first intake passage part **4*a* and second intake passage part 4*b* are provided with a first air flow sensor 7*a* and a second air flow sensor 7*b*, respectively. Further, the air flow sensors 7*a* and 7*b* have temperature sensors 8*a* and 8*b*, respectively. The upstream most ends of the intake passage parts 4*a* and 4*b* are provided with air cleaners 9*a* and 9*b*, respectively. In the engine body 1, reference numeral 10 indicates an intake valve, 11 indicates an exhaust valve, and 12 indicates a piston. Reference numeral 13** indicates an electronic control unit (ECU). This exchanges signals with the components of the engine and performs the various control operations required for operation of the engine.

In this way, here, the internal combustion engine has a plurality of (here, two) intake passages upstream of a single throttle valve 6. Next, the method executed in the present embodiment to find the intake air flow rate in this case will be explained with reference to FIG. 2.

Figure 2:
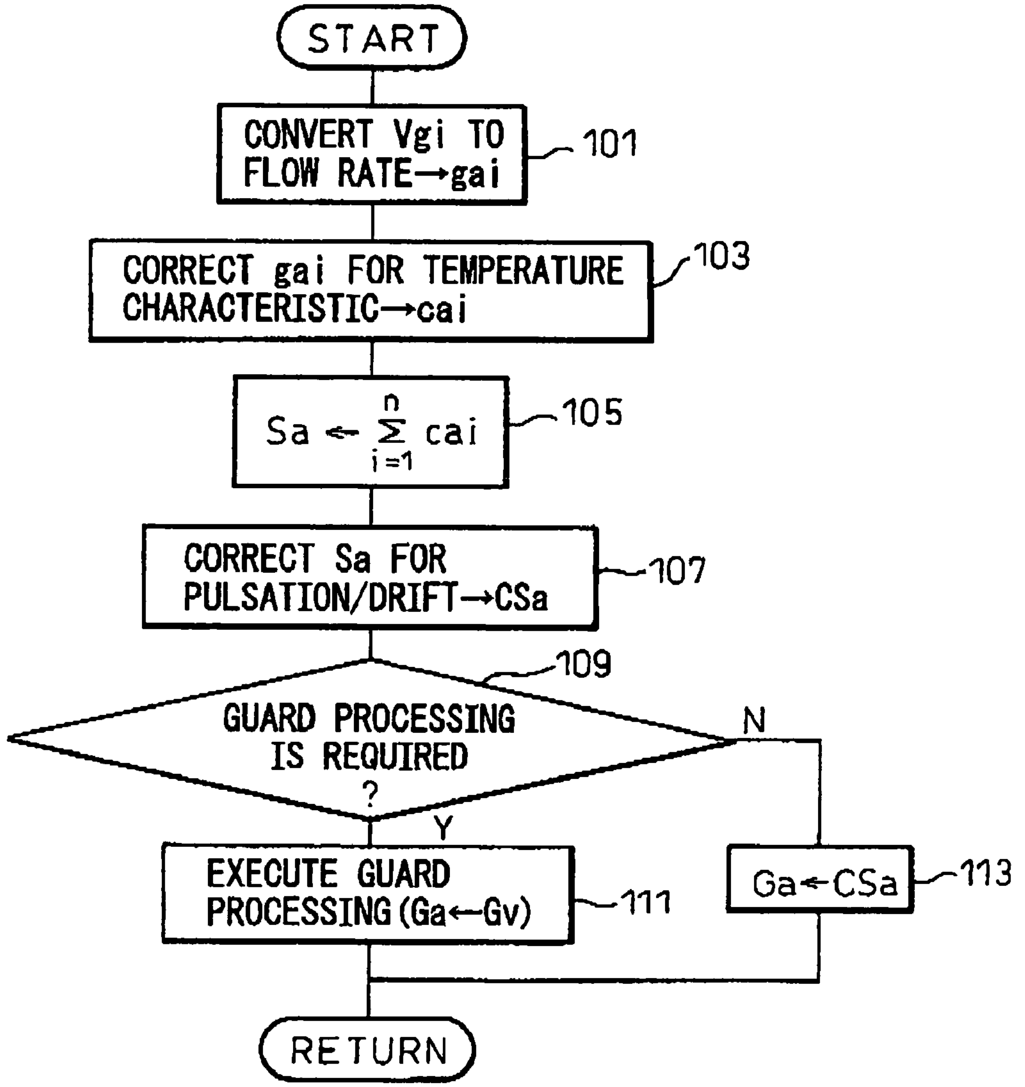
FIG. 2 is a flow chart of a control routine performed for finding an intake air flow rate in a control device of an embodiment of the present invention.

FIG. 2 is a flow chart of a control routine performed by the ECU 13 for finding the intake air flow rate Ga in the control device of an internal combustion engine of the present embodiment. When this control routine is started, first, at step 101 the output voltages Vgi of the air flow sensors 7_a_ and 7_b_ (that is, the output voltage Vg1 of the first air flow sensor 7_a_ and the output voltage Vg2 of the second air flow sensor 7_b_) are converted to flow rates gai (that is, ga1 and ga2). They are converted to these flow rates gai using an output voltage-flow rate conversion map of the relationship between the output voltage and flow rate found in advance for each of the air flow sensors 7_a_ and 7_b_.

When the flow rates gai are found at step 101, the routine proceeds to step 103. At step 103, the flow rates gai are corrected based on the temperature characteristics of the air flow sensors 7_a_ and 7_b_. That is, in general, an air flow sensor changes in output depending on a change in temperature, that is, has a temperature characteristic, so to obtain more accurate measurement results, correction is necessary based on the temperature characteristics of the air flow sensors. In this embodiment, the temperature characteristics of the air flow sensors 7_a_ and 7_b_ are found in advance. At step 103, the flow rates gai are corrected based on the temperatures obtained by the temperature sensors 8_a_ and 8_b_ and the temperature characteristics of the air flow sensors 7_a_ and 7_b_. Due to this, the corrected flow rates cai (that is, ca1 and ca2) are obtained.

More specifically, in this embodiment, the temperature characteristic correction coefficients Ti (that is, T1 and T2) are found in advance as functions of temperature in accordance with the temperature characteristics of the air flow sensors 7_a_ and 7_b_. At step 103, the temperature characteristic correction coefficients Ti are determined in accordance with the temperatures obtained from the temperature sensors 8_a_ and 8_b_ and these are multiplied with the flow rates gai to find the corrected flow rates cai (that is, ca1=ga1×T1, ca2=ga2×T2).

When the corrected flow rates cai are found at step 103, the routine proceeds to step 105, where the corrected flow rates cai are added and the total flow rate Sa is calculated (Sa=ca1+ca2). Note that as will be clear from this explanation as well, the "n" shown at step 105 in FIG. 2 is the total number of the air flow sensors. In the case of this embodiment, it is 2.

When the total flow rate Sa is found at step 105, the routine proceeds to step 107. At step 107, the total flow rate Sa is corrected considering the intake pulsation and intake drift. That is, in general, intake pulsation corresponding to the throttle valve opening degree occurs in the intake passages 4, 4_a_ and 4_b_. This intake pulsation sometimes has an effect on the measurement values of the air flow sensors 7_a_ and 7_b_. When the throttle valve opening degree is small, the intake pulsation is extremely small, so this will seldom have an effect on the measurement values of the air flow sensors 7_a_ and 7_b_. However, if the throttle valve opening degree becomes large, the intake pulsation becomes gradually large. At first, the measurement results of the air flow sensors 7_a_ and 7_b_ tend to fall from the actual flow rates. Further, if the throttle valve opening degree becomes larger and the intake pulsation becomes greater, next the measurement results of the air flow sensors 7_a_ and 7_b_ tend to end up becoming greater than the actual flow rates.

Figure 3:
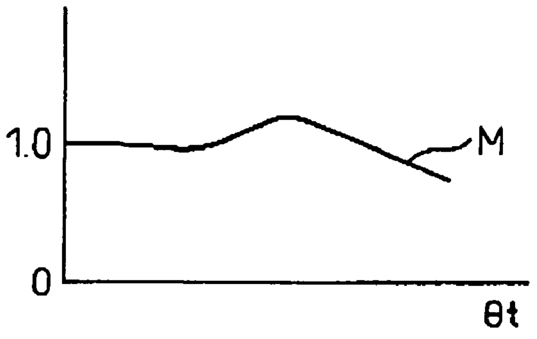
FIG. 3 is a map for finding a pulsation correction coefficient M.

Considering the effects of intake pulsation, in the present embodiment, a pulsation correction coefficient M mapped with respect to the throttle valve opening degree θt, as shown in FIG. 3, is used to correct the total flow rate Sa. More specifically, at step 107, the pulsation correction coefficient M based on the throttle valve opening degree θt at that time is determined based on the map shown in FIG. 3 and is multiplied with the total flow rate Sa.

Further, the air flow sensors 7_a_ and 7_b_ detect the flow rates at positions where their sensing parts are present, but in general intake air does not pass uniformly through the cross-section of an intake passage. To make the measurement results of the air flow sensors 7_a_ and 7_b_ the actual flow rates, it is necessary to set a drift correction coefficient H and make corrections based on the same. Therefore, in the present embodiment, at step 107, a drift correction coefficient H is multiplied with the total flow rate Sa to correct for the effects of intake drift.

As explained above, in this embodiment, at step 107, the total flow rate Sa is multiplied with the pulsation correction coefficient M and the drift correction coefficient H to correct for the effects of intake pulsation and intake drift. Due to this, the corrected total flow rate CSa is obtained (CSa=Sa×M×H). Note that as other embodiments, it is also possible to correct for only one of the intake pulsation and intake drift.

When the corrected total flow rate CSa is found at step 107, the routine proceeds to step 109, where it is judged if guard processing is necessary. Specifically, at step 109, an upper limit Gv of the intake air flow rate able to be assumed in accordance with the engine operating state and the corrected total flow rate CSa found at step 107 are compared. When the corrected total flow rate CSa is larger than the upper limit Gv, it is judged that the guard processing is necessary. On the other hand, when the corrected total flow rate CSa is equal to or less than the upper limit Gv, it is judged that the guard processing is not necessary. Note that here the upper limit Gv is found by preparing in advance a map linking the above upper limit Gv to engine operating states (engine speed and load (for example, acceleration depression etc.) and finding it based on the map in accordance with the engine operating state at that time.

Here, the "guard processing" is the processing for replacing the corrected total flow rate CSa found as the intake air flow rate Ga with the upper limit Gv. That is, if the guard processing is performed, the intake air flow rate Ga is made the upper limit Gv. This processing is for suppressing harm arising due to the air flow sensors 7_a_and 7_b_ ending up measuring the flow rate regarding everything as flow in the intake direction regardless of the actual direction of the flow. That is, since the air flow sensors 7_a_ and 7_b_ end up measuring the flow rate regarding everything as flow in the intake direction regardless of the actual direction of the flow, for example, when back flow occurs, the measurement results sometimes end up becoming intake air flow rates actually impossible. If performing the above guard processing in accordance with need, the value of the intake air flow rate found is prevented from greatly deviating from the actual intake air flow rate even in such a case.

When it is judged at step 109 that guard processing is necessary, the routine proceeds to step 111, where the guard processing is performed and the intake air flow rate Ga is made the upper limit Gv, then the control routine is ended. On the other hand, when it is judged at step 109 that guard processing is not necessary, the routine proceeds to step 113, where the intake air flow rate Ga is made the corrected total flow rate CSa and the control routine is ended.

As explained above, according to this embodiment, it is possible to use air flow sensors provided in intake passages to find the intake air flow rate in an internal combustion engine having two intake passages upstream of a single throttle valve. Further, it is possible to take into consideration the intake pulsation and intake drift and more accurately find the intake air flow rate. Still further, according to this embodiment, even if for example back flow occurs, the value of the intake air flow rate found is prevented from greatly deviating from the actual intake air flow rate.

Next, another embodiment of the present invention will be explained with reference to FIG. 4. The control device of this embodiment can be mounted to the internal combustion engine shown in FIG. 1 and can deal with cases of abnormalities arising in some of the air flow sensors. Note that this embodiment has many parts in common with the above embodiment. Explanations of these common parts will in principle be omitted.

Figure 4:
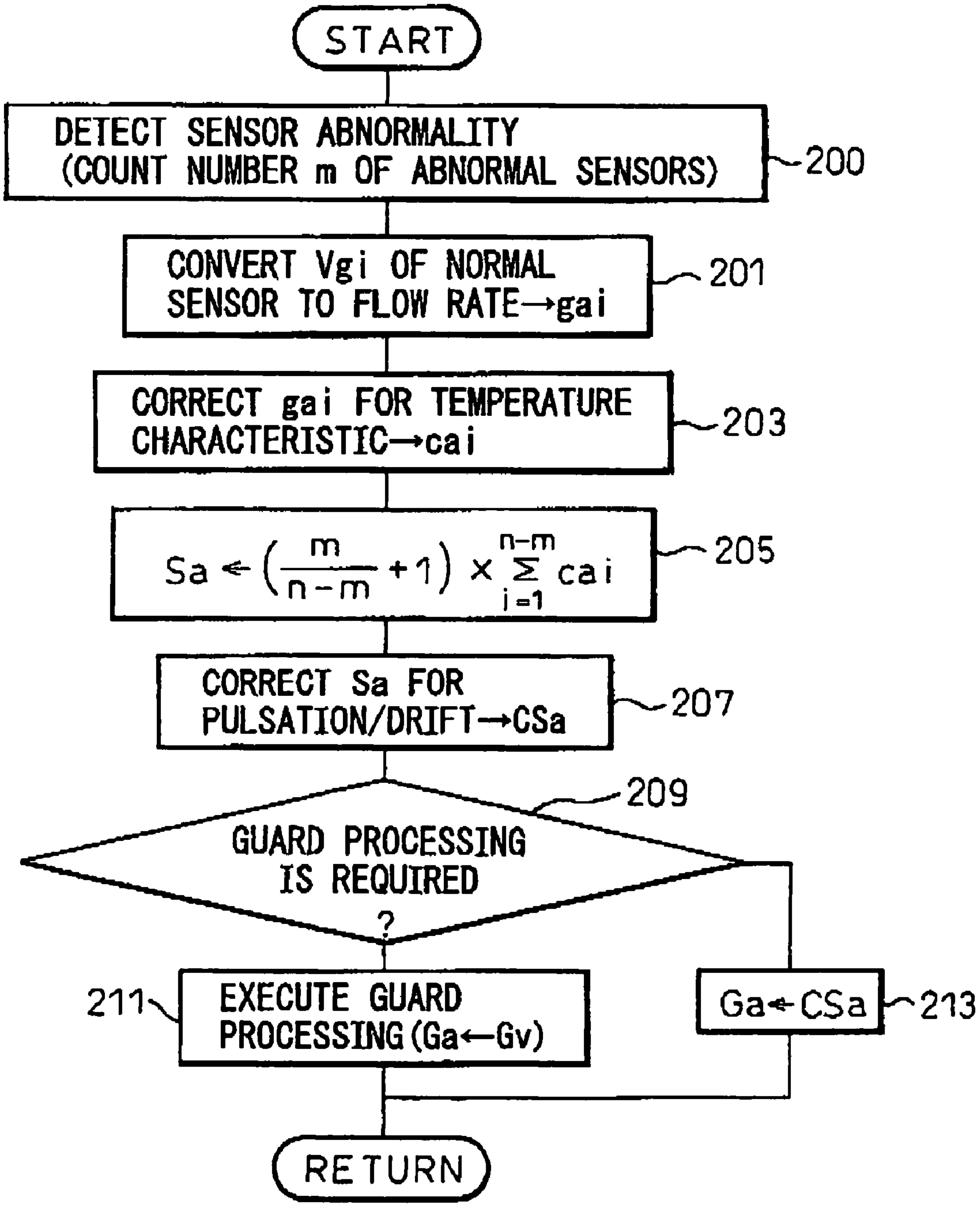
FIG. 4 is a flow chart of a control routine performed for finding an intake air flow rate in a control device of another embodiment of the present invention.

FIG. 4 is a flow chart of a control routine executed by the ECU 13 to find the intake air flow rate Ga in this embodiment. When this control routine is started, first, at step 200, any abnormalities of the air flow sensors 7*a* and 7*b* are detected and the number "m" of the air flow sensors detected as abnormal is counted.

Next, at step 201, the output voltages Vgi from the air flow sensors not detected as abnormal are converted to flow rates gai. Further, at step 203, the flow rates gai found at step 201 are corrected based on the temperature characteristics to find the corrected flow rates cai. The processing performed at step 201 and step 203 is substantially the same as the processing performed at step 102 and step 103, explained above, respectively.

If the corrected flow rates cai are found at step 203, the routine proceeds to step 205, where the following equation (1) is used to calculate the total flow rate Sa:

$$Sa = \left(\frac{m}{n-m} + 1\right) \times \sum_{i=1}^{n-m} cai \tag{1}$$

Note that here, "m" is the number of the air flow sensors detected as abnormal as explained above, while "n" is the total number of air flow sensors (in the present embodiment, two).

Using the above equation (1) to calculate the total flow rate Sa means to assume the flow rate of an intake passage provided with an air flow sensor detected as abnormal to be the flow rate of an intake passage provided with a normally operating air flow sensor (in another embodiment, if there are a plurality of intake passages provided with normally operating air flow sensors, the average value of the flow rates of these intake passages) to calculate the total flow rate Sa. In this embodiment, in the final analysis, the intake air flow rate Ga is found based on this assumption.

When the total flow rate Sa is found at step 205, the routine proceeds to step 207, where in the same way as in the above step 107, the total flow rate Sa is corrected considering the intake pulsation and the intake drift. The processing performed at steps 209, 211, and 213 after this is the same as the processing performed at the above-mentioned steps 109, 111, and 113, so the explanation will be omitted here.

As clear from the above explanation, according to the present embodiment, even if some air flow sensors become abnormal, it is possible to find a substantially accurate intake air flow rate.

Note that above, the explanation was given of the case of two intake passages upstream of a single throttle valve and provision of air flow sensors in these intake passages as an embodiment, but the invention is not limited to this. The invention may also be applied to the case of more than two intake passages upstream of a single throttle valve and provision of air flow sensors in these intake passages.

Further, to simplify the control, the processings from the processing for correcting for the effects of the intake pulsation and intake drift in the above embodiments (that is, step 107 or step 207) may be omitted and the total flow rate Sa used as the intake air flow rate Ga as it is.

Further, regarding occurrence of back flow, it is also possible to apply known back flow detection art and back flow ratio detection art to the above embodiments so as to find a more accurate intake air flow rate Ga at the time of occurrence of back flow.

While the invention has been described with reference to specific embodiments chosen for purpose of illustration, it should be apparent that numerous modifications could be made thereto by those skilled in the art without departing from the basic concept and scope of the invention.

The invention claimed is:

1. A control device for finding an intake air flow rate in an internal combustion engine having a plurality of intake passages upstream of a single throttle valve and having air flow sensors provided in the intake passages, said control device finding the intake air flow rate of said internal combustion engine by converting an output voltage of each said air flow sensor to a flow rate based on a relationship between an output voltage and flow rate found in advance for each air flow sensor, correcting the obtained flow rate in accordance with a temperature characteristic of each said air flow sensor, and adding the corrected flow rates to calculate a total flow rate.

2. A control device for an internal combustion engine as set forth in claim 1, having a correction coefficient for correcting at least one of the effects of intake pulsation and intake drift and multiplying said correction coefficient with said total flow rate to calculate a corrected total flow rate.

3. A control device for an internal combustion engine as set forth in claim 1, having an upper limit setting means for setting an upper limit of the intake air flow rate and making said upper limit the intake air flow rate when the value of the intake air flow rate found exceeds the upper limit set by said upper limit setting means.

4. A control device for an internal combustion engine as set forth in claim 2, having an upper limit setting means for setting an upper limit of the intake air flow rate and making said upper limit the intake air flow rate when the value of the intake air flow rate found exceeds the upper limit set by said upper limit setting means.

5. A control device for an internal combustion engine as set forth in claim 1, wherein the device has an abnormality detecting means for detecting abnormalities in said air flow sensors, and, when an air flow sensor is detected as being abnormal, the intake air flow rate is found by deeming the air flow rate of the intake passage provided with the air flow sensor detected as being abnormal to be the average value of the air flow rates of the intake passages provided with the normally operating air flow sensors.

6. A control device for an internal combustion engine as set forth in claim 2, wherein the device has an abnormality detecting means for detecting abnormalities in said air flow sensors, and, when an air flow sensor is detected as being abnormal, the intake air flow rate is found by deeming the air flow rate of the intake passage provided with the air flow sensor detected as being abnormal to be the average value of the air flow rates of the intake passages provided with the normally operating air flow sensors.

7. A control device for an internal combustion engine as set forth in claim 3, wherein the device has an abnormality detecting means for detecting abnormalities in said air flow sensors, and, when an air flow sensor is detected as being abnormal, the intake air flow rate is found by deeming the air flow rate of the intake passage provided with the air flow sensor detected as being abnormal to be the average value of the air flow rates of the intake passages provided with the normally operating air flow sensors.

8. A control device for an internal combustion engine as set forth in claim 4, wherein the device has an abnormality detecting means for detecting abnormalities in said air flow sensors, and, when an air flow sensor is detected as being abnormal, the intake air flow rate is found by deeming the air flow rate of the intake passage provided with the air flow sensor detected as being abnormal to be the average value of the air flow rates of the intake passages provided with the normally operating air flow sensors.

* * * * *